C. R. MERRIAM.
Soldering Machine.
No. 229,546.   Patented July 6, 1880.
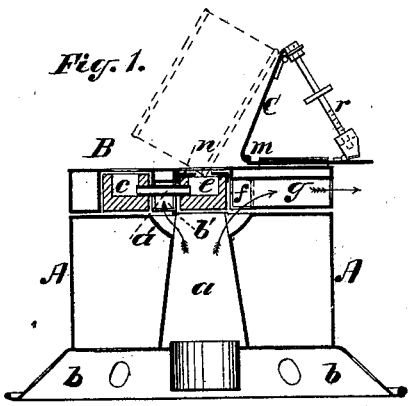
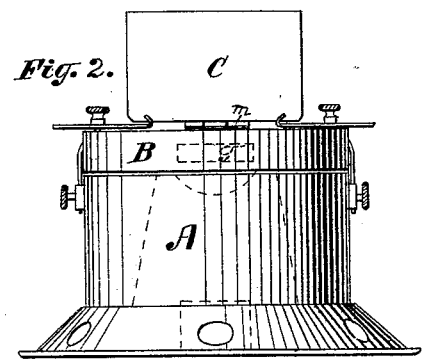
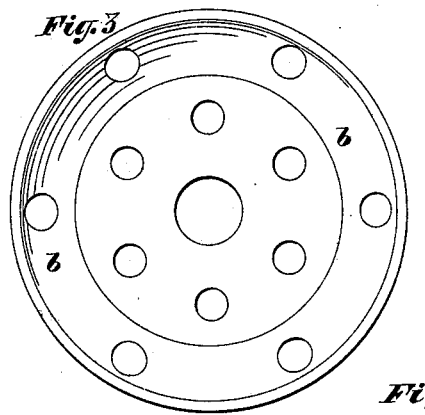
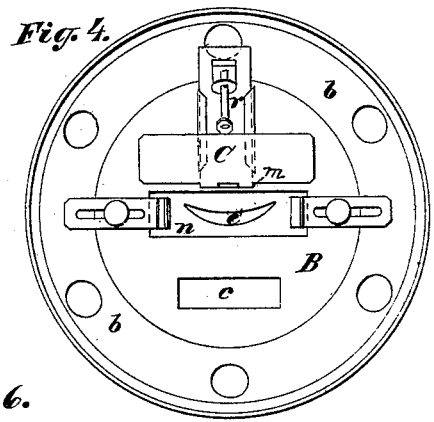
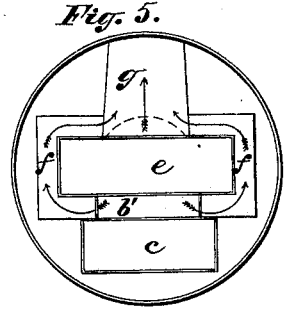
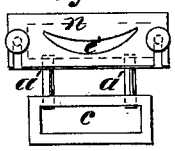
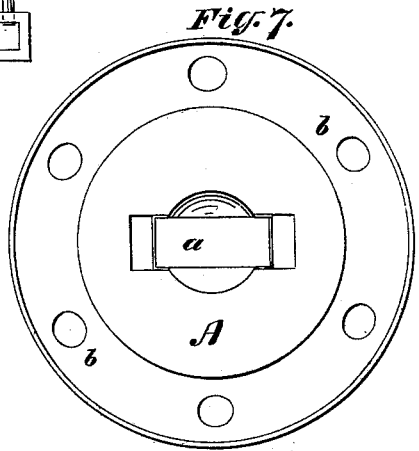
WITNESSES.
H. F. Parker.
Chas. H. Doxat.
INVENTOR.
Chas. R. Merriam
per James A. Whitney
Atty.

UNITED STATES PATENT OFFICE.

CHARLES R. MERRIAM, OF DOVER, DELAWARE, ASSIGNOR OF ONE-HALF OF HIS RIGHT TO LAFAYETTE SMITH, OF SAME PLACE.

SOLDERING-MACHINE.

SPECIFICATION forming part of Letters Patent No. 229,546, dated July 6, 1880.

Application filed February 28, 1880.

*To all whom it may concern:*

Be it known that I, CHARLES R. MERRIAM, of Dover, in the county of Kent and State of Delaware, have invented certain Improvements in Apparatus for Soldering Sheet-Metal Cans, of which the following is a specification.

This invention is designed for soldering the circumferential joints of cylindrical sheet-metal cans, and its object is to provide a simple and portable apparatus, by which the operations aforesaid may be performed by hand with very great expedition and in a very superior manner.

Figure 1 is a vertical sectional view, Fig. 2 a side view, Fig. 3 an inverted plan view, Fig. 4 a plan view, and Figs. 5, 6, and 7 detailed views, of an apparatus embracing my said invention.

A is the cylindric body of the apparatus, formed of sheet metal, and having through its center a flue, $a$, and at its bottom a suitable base, $b$. This body A serves to support the other portions of the apparatus, as hereinafter more fully explained.

B is a melting-pot, composed of two parts, $c$ and $e$, connected by a passage, $a'$. Around the melting-pot B is an annular passage, $f$, with which communicates the outlet-passage $g$. Also connected with this passage $f$ is the passage $b'$, provided between the two parts $c$ and $e$ of the melting-pot B.

Over the part $e$ of the melting-pot B is a plate or cover, $n$, in which is a crescent-shaped opening, $e'$. Placed substantially parallel with this opening $e'$ is a plate, C, hinged at $m$, and the inclination of which may be adjusted or varied by means of a screw, (represented at $r$.)

In the use of the apparatus a gas or any other suitable flame is provided underneath the flue $a$, so that the hot products of combustion would pass upward through said flue, thence through the passages $f$ and $b'$ to the outlet $g$. The solder is placed in the part $c$ of the melting-pot B and is there melted, and, flowing thence through the passage $a'$ into the part $e$ of the melting-pot B, is heated to the heat requisite for the soldering operation.

In carrying said soldering operation into effect the can is placed in the position represented in dotted outline in Fig. 1, with its edge or corner at which is situated the joint to be soldered extended down into and through a crescent-shaped opening, $e'$, so as to dip into the heated solder in the part $e$ of the melting-pot B, the uppermost part of the adjacent edge portion of the can resting against the plate C, which, in conjunction with the edges of the opening $e'$, maintains the can at the requisite angle, so that by simply rotating or turning the can upon its axis all portions of the joint are caused to traverse through the crescent-shaped opening $e$, and consequently through and in contact with the solder, which quickly forms the soldered joints.

What I claim as my invention is—

1. A portable apparatus for hand-soldering cans composed of the following elements, namely: the body A, having the central flue, $a$, a melting-pot having a plate or cover formed with a crescent-shaped opening, $e'$, and a passage or passages for conducting heated products of combustion around or in contact with the exterior of the melting-pot, all combined and arranged substantially as and for the purpose herein set forth.

2. A melting-pot composed of the two parts $c$ and $e$, connected with a passage, $a'$, in combination with the flue $a$ and passage $f$, substantially as and for the purpose herein set forth.

3. The combination of the adjustable hinged plate C with the melting-pot B, having the crescent-shaped opening $e'$ in its top, whereby the angle of the can with reference to the said opening and to the contents of the melting-pot may be regulated, substantially as and for the purpose herein set forth.

CHARLES R. MERRIAM.

Witnesses:
H. F. PARKER,
CHAS. H. DOXAT.